INVENTOR.
Louie M. McCaskill

INVENTOR.
Louie M. McCaskill

ATTORNEYS

March 18, 1969 L. M. McCASKILL 3,433,346
APPARATUS FOR ENGAGING AND RE-ORIENTING CONVEYED ARTICLES
Filed May 29, 1967

INVENTOR.
Louie M. McCaskill
BY Harvey A. David
ATTORNEYS

United States Patent Office 3,433,346
Patented Mar. 18, 1969

1

3,433,346
APPARATUS FOR ENGAGING AND RE-ORIENTING CONVEYED ARTICLES
Louie Millard McCaskill, 5812 Stewart St.,
Hanahan, S.C. 29403
U.S. Cl. 198—33                10 Claims
Int. Cl. B65g 47/24

ABSTRACT OF THE DISCLOSURE

Automatic apparatus for re-orienting articles such as tote-boxes on conveyor means or for transferring articles from one conveyor means to another and comprising article engaging means mounted at the lower end of a vertical rod, pneumatic cylinder means having a reciprocable rod connected to the upper end of the vertical rod by swivel means permitting rotation of the vertical rod during axial movement thereof by the cylinder means, a helical cam disposed about said vertical rod, cam follower means mounted on said vertical rod and connected thereto by overriding clutch means whereby the cam and cam follower are operative to rotate the vertical rod and article engaging means in one direction only so that upon operation of said cylinder said vertical rod will be rotated while an article is lifted and will not rotate when an article is being lowered, and control means responsive to the article position or to indicator means on the article for actuating said cylinder means.

Background of the invention

This invention relates to article handling apparatus, and more particularly to apparatus of automatically re-orienting articles on a conveyor line or transferring articles from a conveyor line at a destination station or to another conveyor or the like.

In conveyor systems, and particularly those wherein the article conveyed such as a tote-box has a destination determining indicator or the like thereon, it is usually necessary that the article be initially placed on the conveyor line in a certain position so that the destination indicator will be detected by the reading device. One commonly used indicator/reader system employs selectively positionable magnetic indicator means and magnetically operated switch or pick-up means in the reader. If the article is not correctly positioned on the conveyor line, it will pass the reader without its destination being detected and the diverting means at the destination station being activated, with the result that the article becomes "lost" in the system. Much time and effort are used in re-routing such articles before they eventually arrive at the proper destination.

In addition, present conveyor systems often utilize a complex diverter apparatus which must be installed in the conveyor line per se for the purpose of transferring articles from one conveyor line to another or for diverting articles at their destination stations.

Summary of the invention

With the foregoing in mind, it is a primary object of this invention to provide article handling apparatus which will automatically re-orient articles improperly placed on a conveyor line so that thereafter the destination indicator thereon can be read by the reading device.

Another object of this invention is the provision of an improved article handling apparatus which may be used as an article diverter for transferring articles from a conveyor line at a destination station or to another conveyor line, without any major modification to the conveyor line itself.

As another object, this invention aims to achieve the foregoing through the provision of an article handling apparatus comprising article engaging means mounted at one end of a vertical rod, actuator means connected to the rod to effect axial movement thereof while permitting rotary movement thereof, helical cam means connected by one-way clutch means to the rod for effecting predetermined rotation thereof when moved axially in direction only, so that movement of the rod in one axial direction will raise the article and movement in the other direction will lower the article and the article will be rotated during only one of such movements.

Brief description of the drawings

FIG. 6 is a schematic illustration of an electrical and pneumatic control circuit;

Description of the preferred embodiments

Figure 1:
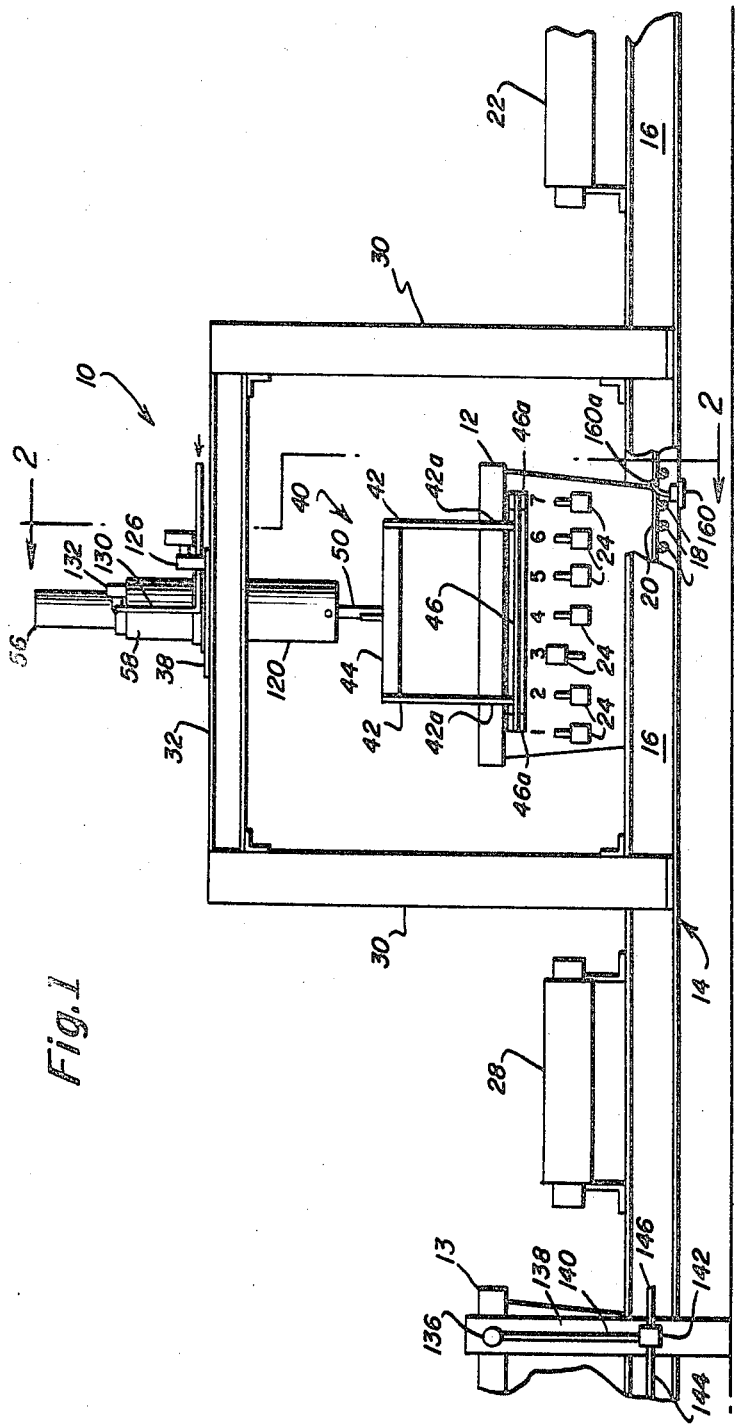
FIG. 1 is a side elevational view of article handling apparatus embodying the present invention and shown in connection with a portion of a conveyor system.

In the form of the invention illustrated in FIGS. 1 through 6 of the drawings and described hereinafter, there is provided an article handling apparatus 10 forming part of a conveyor system for articles such as tote boxes 12, 13 which are to be delivered, for example, to various destinations served by the system. Only a portion of the conveyor system is shown as comprising a conveyor line 14 of conventional construction including parallel side rails 16 between which are a plurality of rollers 18 and an article propelling belt 20 driven by any suitable motor means (not shown). In FIG. 1, the box movement is from left and right as viewed therein.

The conveyor system of the type being described, and with which the handling apparatus 10 of this invention finds particular utility, comprises a magnetic reading head 22 mounted on a side rail 16 and adapted to read the destination of the tote box from the positions of a plurality of selectively positionable magnets 24 arranged in a row along one side of the tote box. The magnets 24 each represent a numbered station, the number of each station being shown above the corresponding magnet. In the present example, the magnet 24 corresponding to destination station number 3 has been displaced upwardly and, if the box 12 were properly oriented when placed on the conveyor line 14, reading head 22 would detect the displaced magnet corresponding to destination station 3 and would activate means down the line to divert the tote box from the system at station 3.

As viewed in FIG. 1, however, the reading head 22 is mounted on the far side rail, and the tote box 17 has been incorrectly placed on the conveyor line 14 with the magnets 24 facing the near side. In this situation, and in the absence of the present invention, the tote box 12 would pass by the reading head 22 with the magnets on the wrong side and so the destination would not be detected and the diverting means at the destination station would not be activated.

The apparatus 10 of the present invention is responsive to a reading head 28 which is disposed on the near side rail 16 so as to detect the presence of the magnets 24 on the wrong side of the box 12, and is operative to pick up the box 12, turn it around 180° so that the magnets face in the direction of the reading head 22 on the far rail, and then replace the box on the conveyor line for travel past the head 22 and on to its destination.

The apparatus 10 comprises a plurality of upright members 30 extending upwardly from the side rails 16 and joined at their upper ends by longitudinal horizontal members 32, 34 and transverse horizontal members 36 to form a framework over the conveyor line 14. A horizontal, central plate 38 is suitably secured on the members 34 and forms a mounting base for lifting and turning means about to be described.

Figure 2:
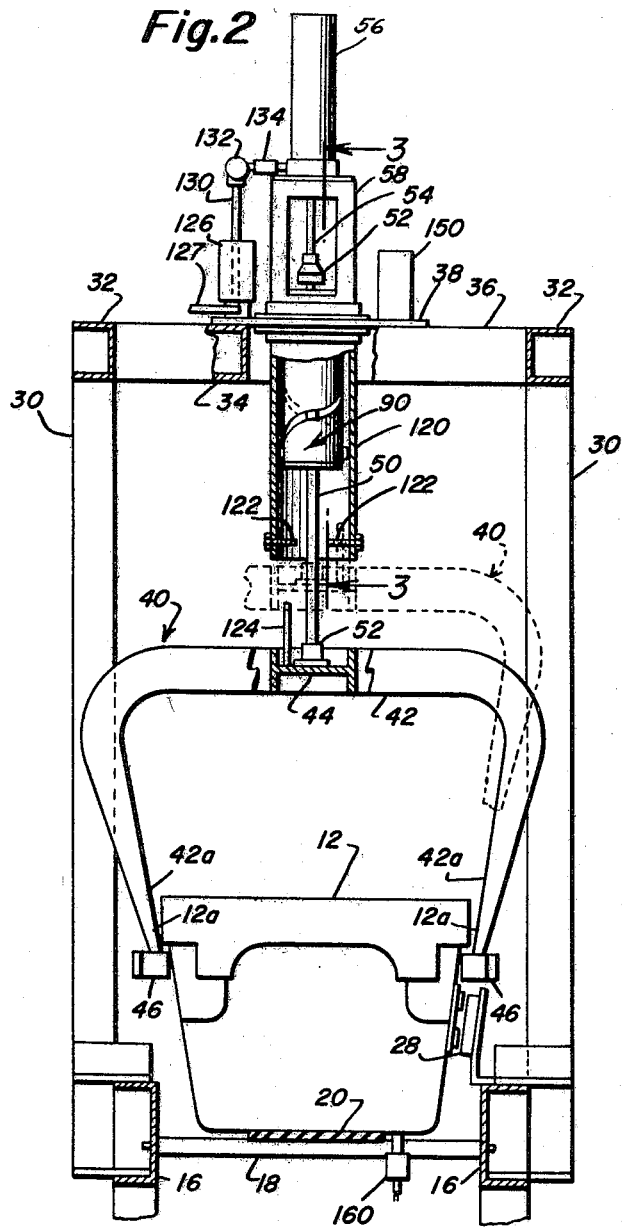
FIG. 2 is an enlarged sectional view taken substantially along line 2—2 of FIG. 1.

The lifting means includes tote box engaging means, generally indicated at 40 and comprising a pair of box spanning members 42 held in spaced relation by a cross bar 44 which is conveniently in the form of an I beam. The spanning members 42 have depending arm portions 42a on the lower ends of which are secured a pair of generally parallel bars 46. The bars 46 are normally aligned with the direction of travel along the conveyor line 14 and have their ends curved outwardly so that tote boxes 12 will be guided therebetween. As is best illustrated in FIG. 2, the tote boxes are provided with an overhanging portion defining a downwardly facing shoulder 12a on each side of the box. The bars 46 are adapted to engage the shoulders 12a and lift the box 12 when the engaging means 40 is raised as described hereinafter.

The box engaging means 40 is supported by a vertical lifting rod 50, the lower end of which is suitably fixed to the cross bar 44, as by means of a socket 52 welded to the web of the bar 44 and provided with a set screw or the like to allow removal of the box engaging means from the rod 50.

Figure 3:
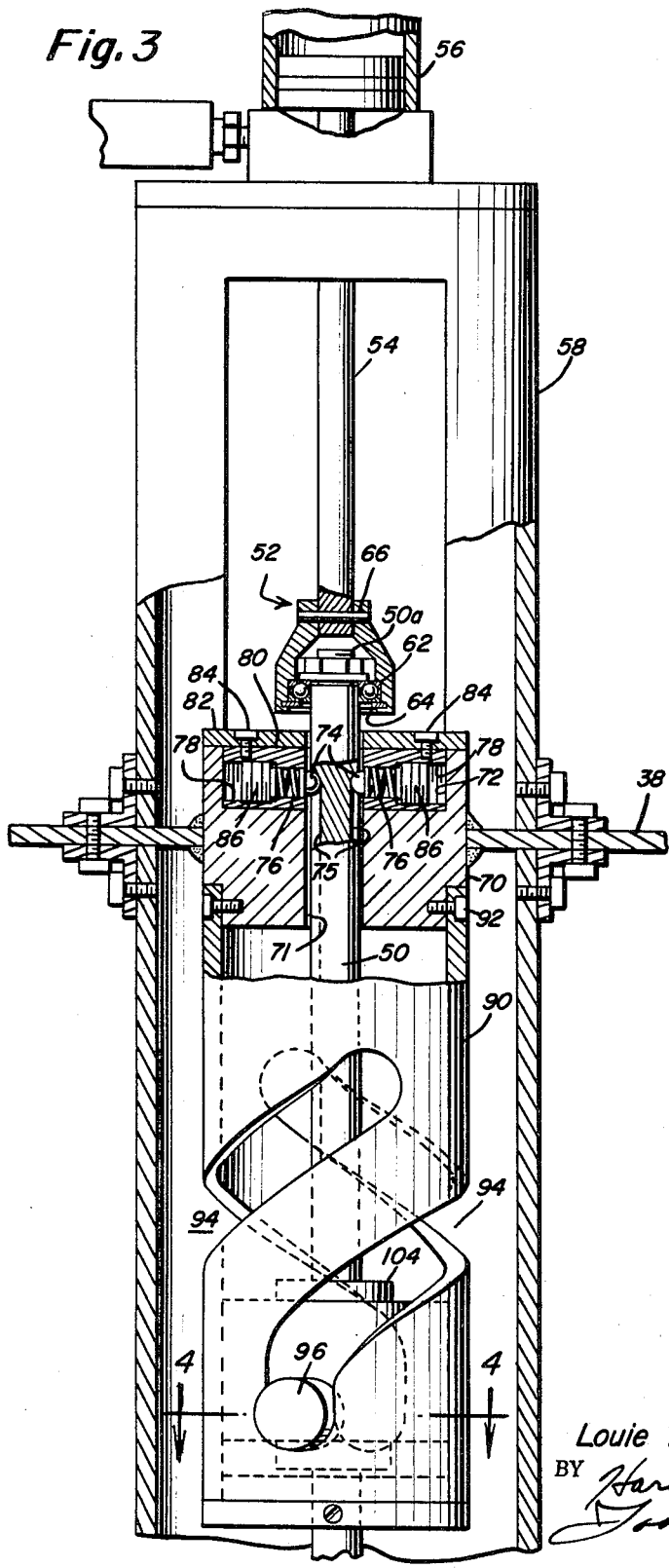
FIG. 3 is a fragmentary sectional view on an enlarged scale taken substantially along line 3—3 of FIG. 2.

Referring now also to FIG. 3, the rod 50 passes upwardly through cam, clutch, and detent means, the purposes of which will be made apparent as the description proceeds, and terminates in a threaded upper end 50a. A swivel joint 52 connects the rod 50 to the lower end of a piston rod 54 of a pneumatic cylinder 56 which is vertically mounted on a hollow, open-sided pedestal 58 mounted on the base plate 38.

The end 50a of rod 50 has a nut 60 engaged thereon which is rotatable on ball-bearing means 62 retained in the swivel joint 52 as by a retainer ring 64. The swivel joint 52 is conveniently secured to the piston rod 54 by a pin 66 and permits rotation of the rod 50 about its long axis while being moved axially by the piston rod 54 of the pneumatic cylinder 56. The latter is operated to lift an improperly positioned tote box 12 in a manner later explained in more detail.

Fixed in an opening in the base plate 38, as by welding or the like, is a cylindrical member 70, through a central bore of which the rod 50 extends freely. The member 70 has a recess 72 in the upper end thereof in which are housed detent means including a pair of balls 74 which are urged into cooperating axial grooves 75 in the rod 50 by compression springs 76. The springs 76 are located in opposed partially threaded bores 78 in a circular member 80 having a central opening through which rod 40 extends. The member 80 is retained in the recess 72 of member 70 by an apertured cover plate 82 secured to member 70 by screws 84. The springs 76 react against plugs 86 screwed into the bores 78. The balls 74 tend to retain the rod 50 in either of two positions wherein the bars 46 of the tote box engaging means 40 are aligned with the conveyor line 14, but permit axial or rotative movement of the rod when sufficient force is applied.

Figure 4:
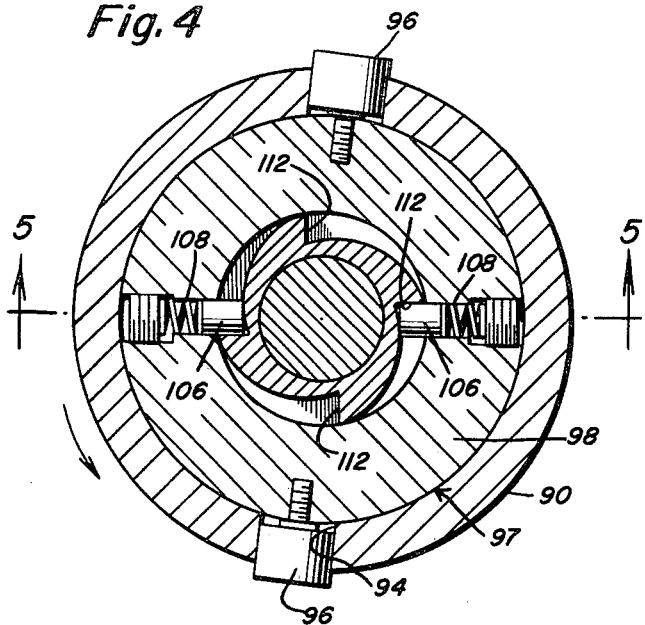
FIG. 4 is an enlarged sectional view taken along line 4—4 of FIG. 3.
Figure 5:
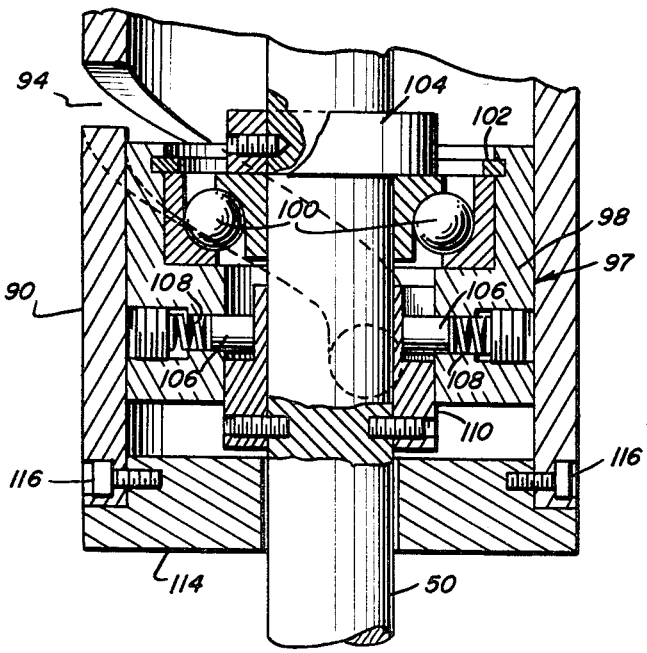
FIG. 5 is a sectional view taken substantially along line 5—5 of FIG. 4.

Rotation of the rod 50, and hence of the box engaging means 40 and a tote box engaged thereby, is effected during lifting by the pneumatic cylinder 56 by means of a hollow cylindrical cam member 90 which is secured as by screws 92 to the lower end of member 70. The cam member 90 is provided with helical cam slots 94 the edges of which cooperate with cam follower rollers 96 extending radially from the outer member 98 of a one-way clutch 97 surrounding the rod 50 and movable within the cam member 90. The one-way clutch is best illustrated in FIGS. 4 and 5 wherein it will be seen that the outer member 98 is rotatably journaled on the shaft 50 by bearing means 100 retained in a recess in the outer member by a ring 102, and also bearing against a collar 104 secured on the rod 50.

The outer member 98 carries a plurality of pawls 106 which are biased inwardly by springs 108 into engagement with an inner, toothed member 110 which is secured to the rod 50. The member 110 has four teeth 112 which cooperate with the pawls 106 to permit rotation of the rod 50 in one direction, and oppose rotation of the shaft in the reverse direction beyond any one of four positions, two of which are such that the box engaging bars 46 are aligned with the conveyor line 14.

The lower end of the cam member 90 is conveniently provided with an apertured guide member 114 through which the rod 50 freely passes and which is fixed to the cam member by screws 116.

Surrounding the cam member 90 is a sleeve 120 which depends from the base plate 38 and is provided near its lower end with a pair of radially inwardly directed stop members 122. These stop members are engageable by an upwardly extending post 124 when the tote box engaging means 40 is raised to the dotted line position of FIG. 2. The post 124 and one or the other of the members 122 cooperate to limit rotation of the tote box more than 180°.

The pneumatic cylinder 56 is supplied with compressed air under the control of a three-way solenoid valve 126 having a pressure input line 127, an exhaust line 128 and an output line 130 connected to a pressure responsive switch 132 and, through an adjustable restriction valve 134 to the cylinder 56. When the cylinder is actuated causing the piston rod 54 and rod 50 to rise and lift a box 12 engaged by the means 40, the helical cam slots 94 acting through followers 96 and the one-way clutch 97 cause the rod 50 and the supported box to rotate 180°, the rotation being limited by the post 124 and a stop member 122.

When air pressure is released from the cylinder 56, the rods 54 and 50 and the supported box are lowered returning the box to the conveyor line but in a reversed position. During lowering, the detent balls 74 and their cooperating grooves 75 prevent rotation of the rod 50 while the one-way clutch 97 allows the cam followers 96 to follow the cam slots 94 without causing rotation of the rod.

A pneumatic stop means 136 is mounted on an upright 138 along the conveyor line 14 ahead of the apparatus 10, and, when actuated, serves to prevent a following tote box 13 from advancing to the apparatus 10 while box 12 is being turned. The stop means 136 is supplied with compressed air through a line 140 under the control of a three-way solenoid valve 142 having a compressed air inlet connection 144 and an exhaust connection 146.

Operation of the pneumatic stop means 136 and pneumatic cylinder 56 are controlled by circuitry illustrated in FIG. 6 and comprising an electrical timer switch 150 having a motor 152, cam 154, and contacts 156. The circuit also comprises a lever actuated switch 160 mounted in the conveyor line 14 for actuation by a tote box 12 when in position between the bars 46 of the box engaging means 40.

Operation of the apparatus will now be described. Assuming that tote box 12 was placed on the line 14 ahead of the reading head 28, and in a position with the destination determining magnets 24 facing as illustrated in FIG. 1, passage of the box by the reading head 28 will have caused the magnetically operated contacts 28a thereof to momentarily close. Closing of the contacts 28a completes a circuit which may be traced from power line L₁ through a conductor 162, contacts 28a, a conductor 164, solenoid 142a of valve 142, and a conductor 166 to power line L₂. The valve 142 is thereby actuated to supply air to the stop means 136, the plunger 136a of which is projected to engage or intercept and stop any tote boxes such as 13 following the box 12.

At the same time, closing of the contacts 28a complete a circuit which may be traced from power line L₁ through conductor 162, contacts 28a, a conductor 168, motor 152, and a conductor 170 to power line L₂, thereby energizing motor 152. Motor 152 turns cam 154 to close contacts 156 which are connected by conductors 172, 174 in parallel with contacts 28a and thereby maintain energization of the stop means actuating solenoid valve 142 and the timer motor 152 after the box 12 passes the reader head 28 and contacts 28a open.

The cam 154 holds contacts 156 closed as the box 12 engages the lever arm 160a of the switch 160, thereby closing contacts 160b thereof. The contacts 160b establish a circuit which may be traced from power line L₁ through conductor 172, contacts 156, a conductor 176, contacts 160b, a conductor 178, solenoid 126a of valve 126, and a conductor 180 to power line L₂. The valve 126 is thereby actuated to admit compressed air to the pressure switch 132 closing contacts 132a thereof, and through the restriction 134 to the pneumatic lifting cylinder 56. The latter thereupon begins the previously described lifting and turning of the tote box 12, the rate of lift being determined by the adjustable restriction 134.

As the box 12 is lifted from the conveyor line 14, the switch arm 160a is released opening the contacts 160b. However, enregization of solenoid valve 126 is maintained by a circuit which may be traced from power line L₁ through contacts 156 of timer 150, a conductor 182, contacts 132a of pressure switch 132, a conductor 184, solenoid 126a, and the conductor 180 to power line L₂.

The cam 154 is selected, and the restriction 134 so adjusted, that the contacts 156 open just after the cylinder 56 has lifted the box 12 and the cam member 90 has effected the 180° turn of the box. Opening of the contacts 156 breaks the circuit to solenoid 126a and the valve 126 connects the cylinder 56 to exhaust, thereby lowering the box to the conveyor line 14 in proper position for the destination determining magnets 24 to be read by the reader head 22.

The switch 160 is disabled by opening of contacts 156 and so lowering of the box onto the switch arm 160a has no further effect. Moreover, opening of contacts 156 de-energizes the timer motor 152 and deactivates the stop means 136, thereby releasing the following box 13.

Figure 7:
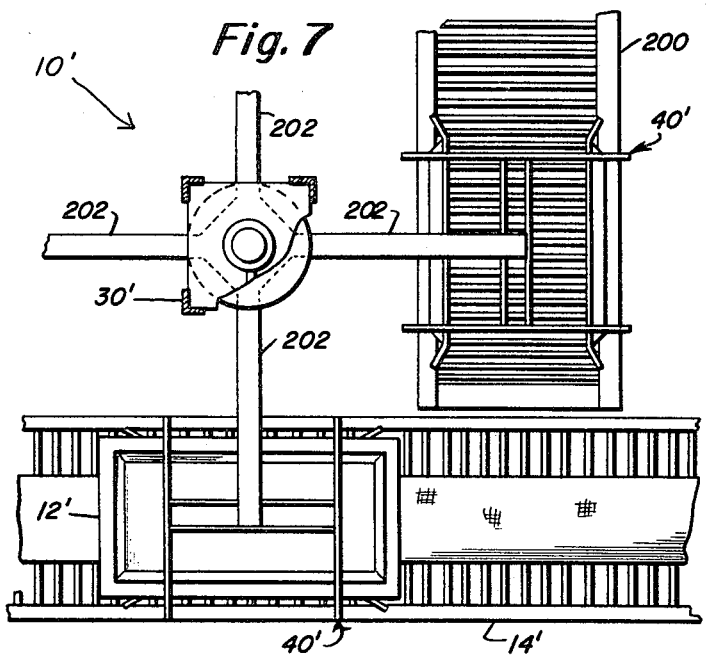
FIG. 7 is a fragmentary plan view of another embodiment of the invention.
Figure 8:
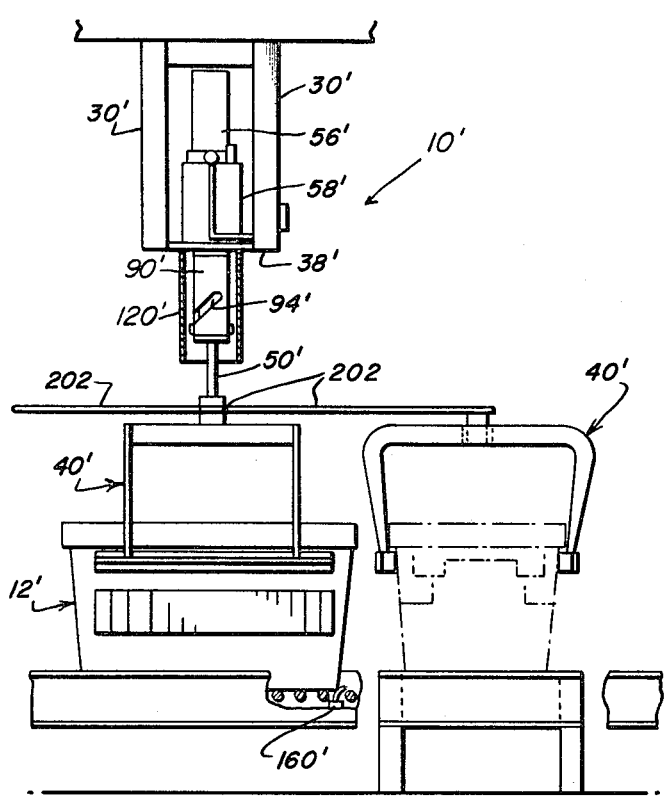
FIG. 8 is a side elevational view of the apparatus of FIG. 7.
Figure 9:
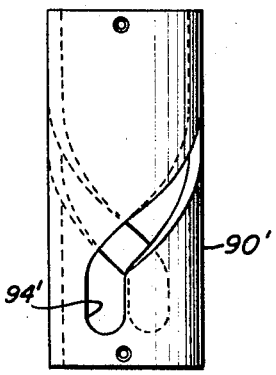
FIG. 9 is an elevational view of a cam member forming part of the apparatus of FIGS. 7 and 8.

Another embodiment of the invention is illustrated in FIG. 7 through 9 in which parts corresponding to previously described parts are denoted by corresponding reference numerals with a prime mark added. This embodiment of article handling apparatus 10' is particularly useful when it is desired to transfer an article from one conveyor line 14' to another conveyor line 200, which in this example extends at right angles to the line 14'.

The apparatus 10' is similar to that described with reference to FIGS. 1-6, but is located to one side of the line 14' and comprises a pneumatic cylinder 56' mounted on a pedestal 58' which is in turn mounted on a base plate 38' supported by upright members 30'. Depending from the plate 38' is a sleeve 120' surrounding a cam member 90'. The cam member 90' (FIG. 9) differs from cam member 90 in that the helical cam slots 94' provide only 90° of rotation to the rod 50'.

As is best illustrated in FIGS. 7 and 8, there is secured to the lower end of rod 50' a support member having four arms 202. At the outer end of each arm 202 is supported a box engaging means, generally indicated at 40'.

A box 12' traveling from left to right on conveyor line 14' and which has been detected by a reading head (not shown) similar to head 28 as being intended for transfer to line 200, is illustrated as engaging a switch 160'. This switch forms part of a circuit similar to that described with reference to FIG. 6 and which causes the cylinder 56' to raise the rod 50' and box 12' while the cam member 90' effects 90° rotation of the rod 50'. This rotation brings the box 12' over conveyor line 200, whereupon the circuit timer causes the cylinder 56' to lower the rod 50' without further rotation and to place the box 12' on the conveyor line 200 for travel in a different direction.

Obviously many modifications and variations of the present invention are possible in the light of the above teachings.

The invention described herein may be manufactured and used by or for the Government of the United States of America for governmental purposes without the payment of any royalties thereon or therefor.

What is claimed is:

1. In a conveyor system for moving articles along one or more predetermined paths, article handling apparatus for engaging and re-orienting articles having a predetermined characteristic, said apparatus comprising:
    reader means for sensing a predetermined characteristic of articles passing thereby;
    article engaging means for engaging, lifting, turning and lowering articles having the characteristic sensed by said reader means;
    rotatable and axially reciprocable rod means connected to said article engaging means;
    support structure;
    actuator means mounted on said support structure, said actuator means having a reciprocable element connected to said rod means for effecting axial movement thereof and permitting rotary movement thereof;
    control means connected between said reader means and said actuating means whereby the latter is responsive to the former; of;
    a cam, cam follower, and one-way clutch means interconnecting said support structure and said rod means;
    said cam, cam follower, and one-way clutch means cooperating to produce rotary motion in said rod means upon axial movement thereof in one direction by said actuator means, and said one-way clutch means rendering said cam and cam follower ineffective to produce rotary movement of said rod means when moved axially in the opposite direction, whereby said article engaging means is operated to engage, lift, turn and lower articles.

2. In a conveyor system, article handling apparatus as defined in claim 1 and wherein:
    said article engaging means comprises a plurality of article engaging elements;
    arm means supporting said article engaging elements for rotation in a circular path upon rotation of said rod means, whereby said article engaging elements are adapted to engage and lift an article from one conveyor path and deposit it on another conveyor path.

3. In a conveyor system, article handling apparatus as defined in claim 1 and wherein:
    said reader means comprises a first electric switch momentarily operable to a closed position upon passage of an article having said predetermined characteristic;
    said control means comprises timer switch means actuable to a closed position for a predetermined time period in response to closing of said first switch;
    second switch means connected in series with said timer switch and actuable to a closed position by arrival of said article at said article engaging means, said second switch being connected to effect actuation of said actuator means so that said article engaging means lifts and turns said article; and third switch means connected in series with said timer switch means and operable to a closed position in response to actuation of said actuator means, said third switch means being connected to provide a holding circuit for said actuator to maintain actuation thereof upon opening of said second switch means;

said timer switch being operative after said time period to break said holding circuit whereupon said actuator permits said article engaging means to lower said article.

4. In a conveyor system, an article handling apparatus as defined in claim 3 and wherein:

said actuator means comprises a pneumatic cylinder and solenoid valve for controlling actuation thereof from a compressed air source.

5. In a conveyor system, an article handling means as defined in claim 4 and further comprising:

holding means connected to said control circuit and actuable in response to closing of said timer switch means to restrain articles following an article having said predetermined characteristic.

6. In a conveyor system, article handling apparatus as defined in claim 5 and wherein:

said cam is mounted on said support structure;

said one way clutch has a first portion fixed for movement with said rod means and a second portion rotatable in one direction with respect to said first portion and carrying said cam follower.

7. In a conveyor system, article handling apparatus as defined in claim 6 and wherein:

said cam comprises a helical cam member disposed in surrounding relation to said rod means and said one-way clutch.

8. In a conveyor system, article handling apparatus as defined in claim 7 and further comprising:

cooperable stop means on said article engaging means and on said support structure for limiting rotation of said article engaging means when in a lifted position.

9. In a conveyor system, article handling means as defined in claim 8 and further comprising:

detent means for releasably resisting rotation of said rod means from any of a plurality of rotative positions.

10. In a conveyor system, article handling means as defined in claim 9 and wherein:

said detent means comprises spring biased ball means carried by said support structure and cooperable with longitudinal grooves in said rod means.

References Cited

UNITED STATES PATENTS

| 2,915,166 | 12/1959 | Grover | 198—33 |
| 3,297,132 | 1/1967 | Ripple | 198—33 |

FOREIGN PATENTS

| 1,394,191 | 2/1965 | France. |

EDWARD A. SROKA, *Primary Examiner.*